United States Patent [19]

Beisswenger et al.

[11] Patent Number: 4,747,356
[45] Date of Patent: May 31, 1988

[54] PROCESS OF BURNING CATTLE DUNG

[75] Inventors: Hans Beisswenger, Bad Soden; Fred Cappel, Dreieich; Dirk Hankel; Walter Koch, both of Mühlheim, all of Fed. Rep. of Germany

[73] Assignee: Metallgesellschaft AG, Frankfurt am Main, Fed. Rep. of Germany

[21] Appl. No.: 11,559

[22] Filed: Feb. 4, 1987

[30] Foreign Application Priority Data

Feb. 12, 1986 [DE] Fed. Rep. of Germany ....... 3604318

[51] Int. Cl.4 ............................................. F23B 7/00
[52] U.S. Cl. ..................................... 110/343; 110/245; 110/346
[58] Field of Search ............... 110/245, 342, 343, 346, 110/238

[56] References Cited

U.S. PATENT DOCUMENTS

| | | |
|---|---|---|
| 3,864,458 | 2/1975 | Roberts . |
| 3,907,674 | 9/1975 | Roberts . |
| 4,111,800 | 9/1978 | Herendza-Harinxma ...... 110/342 X |
| 4,253,408 | 3/1981 | Kramer ........................... 110/343 X |
| 4,428,310 | 1/1984 | Kekish et al. ........................ 100/342 |
| 4,481,890 | 11/1984 | Lewis ................................... 110/346 |

FOREIGN PATENT DOCUMENTS

| | | |
|---|---|---|
| 0003831 | 2/1979 | European Pat. Off. . |
| 2514046 | 4/1974 | Fed. Rep. of Germany . |
| 2732630 | 1/1978 | Fed. Rep. of Germany . |
| 2855650 | 7/1980 | Fed. Rep. of Germany . |
| 2945500 | 5/1981 | Fed. Rep. of Germany . |

OTHER PUBLICATIONS

JP-Patents Abstracts of Japan M-371, Apr. 13, 1985, vol. 9, No. 84, Ref.-Nr. 59-212615.
Report entitled, Thermal Conversion of Cattle Feedlot Manure for Energy Production; Sweetan et al.

Primary Examiner—Edward G. Favors
Attorney, Agent, or Firm—Felfe & Lynch

[57] ABSTRACT

Disclosed is a process for burning cattle dung at a temperature of from 500° to 780° C., preferably from 650° to 780° C., in the presence of one or more aluminum-containing substances selected from the class consisting of bauxite, kaolin and aluminum compound-containing ash from furnaces for firing solid fuels. A major part of the alkalies contained in the cattle dung and a substantial part of the chlorine are retained in combined form in the resulting furnace ash.

5 Claims, 1 Drawing Sheet

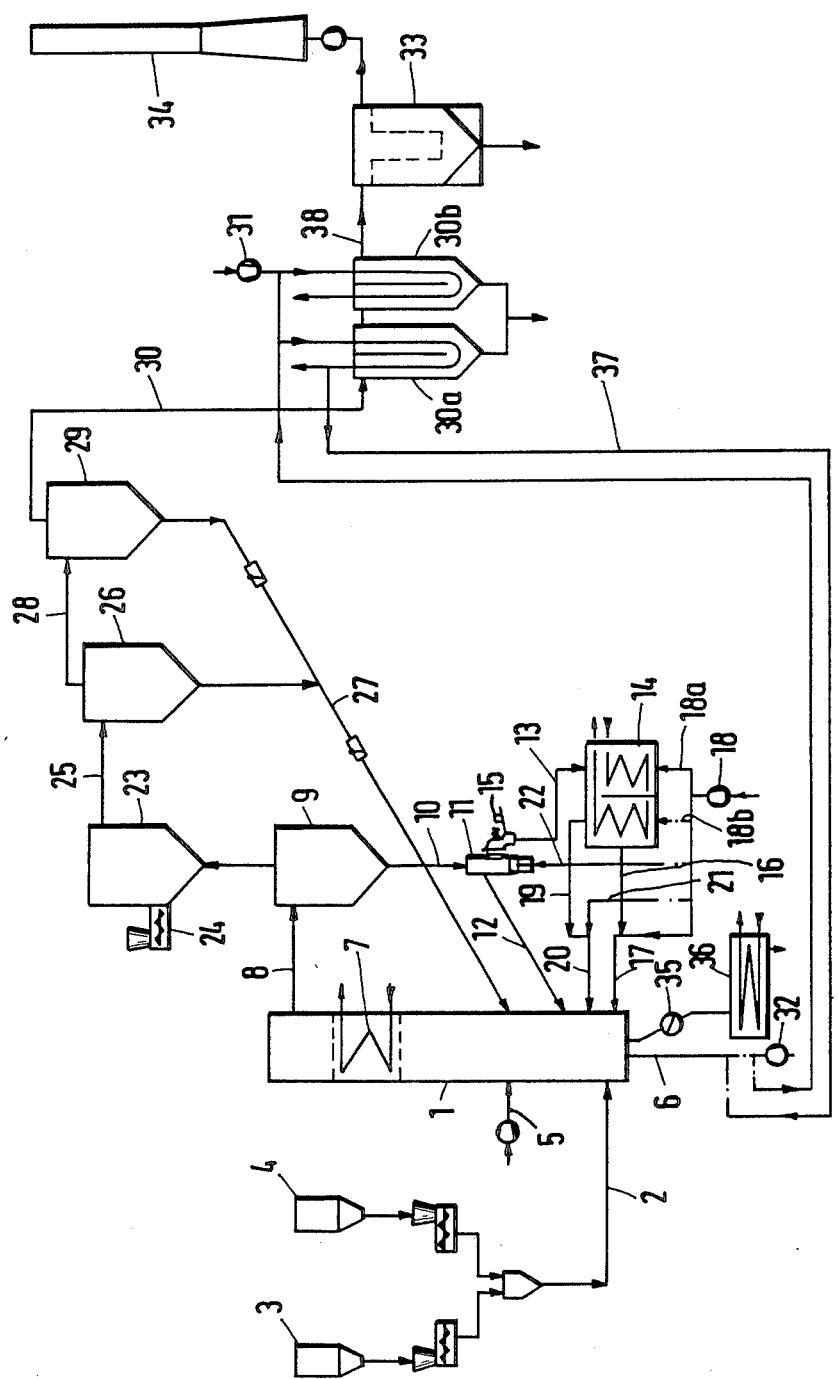

PROCESS OF BURNING CATTLE DUNG

BACKGROUND OF THE INVENTION

The present invention is in a process of burning animal waste and more specifically in a process for burning cattle dung.

Large herds of cattle kept in confined spaces produce a large quantity of cattle droppings, which must be disposed of from time to time. Depending on the nature of the feed, the cattle dung has a relatively high content of alkalies and chlorine making it unsuitable for use as fertilizer and presenting a disposal problem.

U.S. Pat. No. 3,864,458 discloses a process of incinerating aqueous organic waste which have a high content of chlorine as alkali metal chlorides or alkaline earth metal chlorides. Such waste sludges are formed, e.g., in municipal clarifying plants, in refineries or as ballast water of tankers. The combustion is effected at a temperature of 621° to 788° C. in a stationary fluidized bed in the presence of added sulfur compounds and, if desired, in the presence of added fuel. Sulfur is added to avoid bed defluidization. The sulfur is added in a form available for reaction with chlorides, such as $H_2SO_4$, in order to cause most or all of the chlorine content to be volatilized as HCl, so that the formation of low-melting alkali chlorides or low-melting eutectics will be avoided. HCl must be removed from the exhaust gases by scrubbing with $CaCO_3$ or lime. This technique produces large quantities of substances which present another disposal problem. The high HCl concentrations give rise to severe corrosion problems in the succeeding gas processing equipment requiring replacement or expensive and exotic construction materials and fabrication techniques. Thus, the process of this patent results in a disposal problem and is plagued with variable economics.

U.S. Pat. No. 3,907,674 teaches that the presence of other elements, such as magnesium, in the process of U.S. Pat. No. 3,864,458 results in formation of low-melting eutectic mixtures. The formation of such mixtures results in the defluidization of the fluidized bed, even if the process is so controlled that the chlorine content is completely volatilized as HCl, the alkali metals are completely converted to sulfates and the combustion is effected at a temperature in the range of from 620° to 787° C., below the volatilization temperature of the alkali chlorides. For that reason U.S. Pat. No. 3,907,674 recommends modifying the process so that the combustion of the aqueous waste stream is effected at temperatures of from 800° to 1000° C. in the presence of sulfur or sulfur-containing compounds, of added fine-grained $SiO_2$ having a particle size below 44 $\mu$m and of at least one added metal oxide of the group CaO, MgO, $Al_2O_3$ and $Fe_2O_3$. As a result, a considerable part of the alkali chlorides is volatilized and discharged with the exhaust gas and the remainder combines with the metal oxides to form high-melting crystalline alkali compounds. But the volatilized alkali chlorides give rise to corrosion problems in the succeeding gas processing system equipment, and to a formation of deposits and crusts in steam boilers and gas purifiers, i.e., to serve disturbances in operation.

SUMMARY OF THE INVENTION

It is an object of this invention to burn cattle dung in such a manner that the disadvantages involved in the combustion of aqueous organic waste sludges are avoided and virtually all products obtained can be dumped without polluting the environment.

That object and others are accomplished in accordance with the invention in that the cattle dung is burnt at a temperature of from 500° to 780° C., preferably from 650° to 780° C., in the presence of one or more added aluminum-containing substances selected from the group consisting of bauxite, kaolin or aluminum compound containing ash from furnaces for burning solid fuel, and a major part of the alkalies contained in the cattle dung and a substantial part of the chlorine are caused to be retained in the furnace ash.

The material being burnt is agitated in the furnace. Bauxite, kaolin or ash which contains aluminum compounds is added to the cattle dung as it is charged into the combustion furnace. Particularly good results will be obtained if bauxite is added. The furnace is initially charged only with said additives so that they form a bed before the cattle dung is supplied. That practice will avoid operational problems which might otherwise arise until a steady-state operation has been achieved. The additives are added in a particle size below 2 mm. The additives and the temperature are so selected that a major part of the alkalies and a substantial part of the chlorine compounds are retained in the ash formed by the combustion so that the volatilization of chlorine as HCl and the volatilization of alkali chlorides are minimized.

The combustion furnaces may consist, e.g., of circulating fluidized beds, stationary fluidized beds, combined fluidized beds and multiple-hearth furnaces, multiple hearth furnaces, or rotary kilns.

In a preferred embodiment, combustion is effected at a temperature of 650° to 780° C. Particularly good results will be produced in that temperature range.

In a preferred embodiment the aluminum-containing substances are added in an amount of 3 to 30% by weight of dry cattle dung. An addition in that range will result in good operating conditions for the combustion and in a furnace ash which can readily be dumped.

In an especially preferred embodiment the aluminum-containing substances are added in an amount of 4 to 20% by weight of dry cattle dung. An addition in that range will result in particularly good operating conditions for the combustion and in a furnace ash which can readily be dumped.

In a preferred embodiment the combustion is effected in a circulating fluidized bed, which is operated with oxygen-containing fluidizing gas and oxygen-containing secondary gas. A circulating fluidized bed differs from an "orthodox" fluidized bed, in which a dense phase is separated by a distinct step in density from the overlying gas space, whereas the circulating fluidized bed involves distribution states having no defined boundary layer and there is no density step between a dense phase and an overlying gas space but the solids concentration in the reactor decreases continuously from substantially the bottom to top. The solids entrained by the gases leaving the fluidized bed reactor are recycled to the fluidized bed reactor in such a manner that the quantity of solids circulated per hour is at least 5 times the weight of the solids contained in the fluidized bed reactor. The circulating system used to form a circulating fluidized bed comprises a fluidized bed reactor, a separator and a recycling line. The solids may be cooled by cooling surfaces which are provided in the upper portion of the fluidized bed reactor above the secondary air inlet in the fluidized bed and/or in a fluidized bed cooler, which is operated to maintain an orthodox fluidized bed. Part of the separated solids are supplied to that fluidized bed cooler and are fluidized therein by means of air that is injected at the bottom and are cooled on cooling surfaces and the cooled solids are then recycled to the fluidized bed reactor. The heated cooling air is supplied to the fluidized bed reactor, suitable as secondary air. Product may be discharged at the bottom of the fluidized bed reactor, from the recycling line or after the fluidized bed cooler.

If the operating conditions of the circulating fluidized bed are defined by the Froude and Archimedes numbers, the following ranges will be obtained:

$$0.1 \leq \frac{3}{4} \times Fr^2 \times \frac{\rho g}{\rho k - \rho g} \leq 10$$

and $$0.01 \leq Ar \leq 100,$$

wherein $$Ar = \frac{d_k^3 \times g(\rho_k - \rho_g)}{\rho_g \times \nu^2}$$

$$Fr^2 = \frac{u^2}{g \times d_k}$$

u = the relative gas velocity in m/sec.
Ar = Archimedes number
Fr = Froude number
$\rho_g$ = density of gas in kg/m$^3$
$\rho_k$ = density of solid particle in kg/m$^3$
$d_k$ = diameter of spherical particle in m
$\nu$ = kinematic viscosity in m$^2$/sec.
g = gravitational constant in m/sec.$^2$ Details of the operation of circulated fluidized beds are addressed in the article "Wirbelschichtprocesse für die Chemie und Hüttenindustrie, die Energieumwandlung und den Umweltschutz", Chem. Ing. Techn. 55 (1983), No. 2, pages 87-94, German Patent Specification 25 39 546, U.S. Pat. No. 4,165,717, and Published German Application No. 26 24 302 and U.S. Pat. No. 4,111,158.

The circulating fluidized bed can be operated at a high throughput rate. As disclosed in U.S. Pat. Nos. 4,165,717 and 4,111,158, the free shaft velocity of the gas in the fluidized bed reactor is 5 to 15 m/sec and the mean solids density loading above the secondary gas inlet is from 10 to 100 kg/m$^3$.

Because the fresh cattle dung is rapidly distributed and dispersed in the fluidized ash in the fluidized bed reactor and because the combustion is effected in two stages by means of primary air and secondary air, a local overheating, which would result in a sintering and a formation of crusts, will reliably be avoided.

In another preferred embodiment, the combustion is effected in a multiple-hearth furnace. The multiple-hearth furnace may be a furnace with scraping arms, which displace the material so that it falls from hearth to hearth. The multiple-hearth furnace may be provided with an underlying orthodox fluidized bed, too. In that case the material is preheated on the hearths provided with scraping arms and then falls into the fluidized bed, which constitutes the combustion zone. Such a furnace is described in Published German Application 2,037,561 and U.S. Pat. No. 3,772,998.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

BRIEF DESCRIPTION OF THE DRAWING

The FIGURE schematically depicts a flow scheme for the preferred embodiment of the process of the invention.

DESCRIPTION OF A PREFERRED EMBODIMENT

Referring to the drawing, cattle dung from a bin 3 is charged through a supply line 2 into the fluidized bed reactor 1 on a level above the nozzle plate. The dung can be charged by means of a water-cooled single screw feeder or a pneumatic conveyor. Aluminum-containing substances are charged from the bin 4. An oil burner 5 is used for heating up. Primary air is supplied through line 6 into the nozzle plate of the fluidized bed reactor. Cooling surfaces 7 are provided in the upper portion above the secondary air inlet of the fluidized bed reactor 1. A gas-solids suspension is exhausted from the reactor near its top through line 8 into a recycling cyclone 9. The solids separated in cyclone 9 are conducted through line 10 into a U-shaped fluidized seal 11. A portion of the separated solids are directly recycled to the fluidized bed reactor 1 through line 12 and another part is supplied through line 13 into a fluidized bed cooler 14. The rates of the respective solids flows are controlled by an adjustable rod 15.

The solids cooled in fluidized bed cooler 14 are recycled to the fluidized bed reactor 1 through lines 16, 17. Fan 18 supplies fluidizing air through lines 18a and 18b at the bottom of fluidized bed cooler 14. The heated fluidizing air is exhausted from cooler 14 and is supplied through lines 19, 20 as secondary air into the fluidized bed reactor. A partial stream of the air delivered by the fan 18 is supplied as secondary air through line 21 directly into line 20. Another partial stream is supplied as fluidizing air through line 22 into the seal pot 11.

Gas from the recycling cyclone 9 passes into a venturi apparatus 23. The venturi apparatus 23 is charged through a screw feeder 24 with aluminum-containing substances which are preheated in the venturi. A gas-solids suspension leaves the reactor through line 25 and is introduced into cyclone separator 26. Separated solids are delivered through the recycling line 27 into the fluidized bed reactor 1. Gas from the separator 26 passes through line 28 to cyclone separator 29. Solids separated in the separator 29 are also delivered to the recycling line 27 or are withdrawn from the system. Gas leaving separator 29 through line 30 passes into a two-stage exhaust gas cooler 30a, 30b and is indirectly cooled therein with air delivered by the fan 31 and/or a vane compressor 32. Heated cooling air from the first stage 30a is delivered via line 37 as primary air into line 6 to be introduced into reactor 1. The cooled gas leaving cooler 30b is delivered through line 38 into a cloth filter 33 and then into the chimney 34. Air can be sucked in before the cloth filter through a stub duct (not shown) to reduce the gas temperature. Furnace ash is removed at the nozzle plate of the fluidized bed reactor 1 between sealing rolls 35 and is cooled in a cooler 36.

EXAMPLES 1 AND 2

The fluidized bed reactor 1 had a height of 10 m and an inside diameter of 0.7 m in the upper part and 0.5 m up to a 1.8 m height above the nozzle plate.

The cattle dung was air-dried and was disintegrated by means of a shredder to form lumps of less than 25 mm. It contained 27.7% water. It was introduced into reactor 1 at a level which was about 1.8 m above the nozzle plate. Secondary air is introduced on a level which was about 3 meters over the bottom.

The cattle dung had an analysis on a dry basis as follows:

| | |
|---|---|
| Ash | 39.3% |
| Volatiles | 48.3% |
| Fixed Carbon | 12.4% |
| Total sulfur | 0.75% |
| Total carbon | 30.6% |
| Hydrogen | 3.93% |
| Chlorine | 1.49% |
| Nitrogen | 2.44% |

Higher heating value $H_o = 12,490$ kJ/kg
Lower heating value $H_u = 11,630$ kJ/kg
The ash had the following composition:

| | |
|---|---|
| $SiO_2$ | 52.8% |
| $Al_2O_3$ | 5.6% |
| $Fe_2O_3$ | 1.9% |
| CaO | 9.8% |
| MgO | 3.5% |
| $K_2O$ | 9.4% |
| $P_2O_5$ | 5.5% |
| $TiO_2$ | 0.31% |
| Na | 3.9 |

The bauxite had a particle size below 2 mm and the following analysis:

| | |
|---|---|
| $SiO_2$ | 2.9% |
| $Al_2O_3$ | 45.0% |
| $Fe_2O_3$ | 17.3% |
| CaO | 0.62% |
| $K_2O$ | 0.38% |
| Mn | 0.35% |

| | | Example 1 | Example 2 |
|---|---|---|---|
| Cattle dung, moist | kg/h | 350 | 320 |
| Bauxite | kg/h | 12.9 | — |
| Furnace ash | kg/h | — | 50 |
| Primary air | sm³/h | 640 | 640 |
| Secondary air | sm³/h | 280 | 280 |
| Reactor temperature | °C. | 760–780 | 760–780 |
| Reactor differential pressure | m bars | 90–95 | 80–90 |
| $O_2$ content of exhaust gas | % | 3.8–4.0 | 5.8–6.0 |
| HCl content of exhaust gas, dry basis | mg/sm³ | 809 | 1032 |
| Percentage of Cl content retained in furnace ash | % | 79 | 71 |
| Alkali content of furnace ash | | | |
| $Na_2O$ | % | 3.5 | 2.9 |
| $K_2O$ | % | 6.3 | 4.8 |
| Percentage of alkali retained in furnace ash | % | 100 | 100 |
| Degree of carbon combustion | % | >98 | >98 |

The advantages afforded by the invention reside in that the cattle dung can be burnt without difficulty and at a high throughput rate, a very large proportion of the alkalies is retained in the furnace ash and are contained therein as non-polluting and non-aggressive compounds, a substantial part of the chlorine content is also retained in the furnace ash in the form of non-polluting and non-aggressive compounds so that the corrosion problems in the units succeeding the furnace are minimized, and the removal of the residual chlorine from the exhaust gases is greatly simplified.

It will be understood that the specification and examples are illustrative but not limitative of the present invention and that other embodiments within the spirit and scope of the invention will suggest themselves to those skilled in the art.

We claim:

1. A process of burning cattle dung, comprising: combusting the cattle dung at a temperature of from 650° to 780° C., in the presence of one or more added aluminum-containing substances selected from the group consisting of bauxite, or aluminum compound containing ash from the burning of solid fuel, to retain a major part of the alkalies contained in the cattle dung and a substantial part of the chlorine in the resulting ash.

2. The process of claim 1 wherein the aluminum-containing substance is added in an amount of 3 to 30% by weight of dry cattle dung.

3. The process of claim 2 wherein the aluminum-containing substance is added in an amount of 4 to 25% by weight of dry cattle dung.

4. The process of claim 1 wherein the combustion is effected in a circulating fluidized bed, which is operated with oxygen-containing fluidizing gas and oxygen-containing secondary gas.

5. The process of claim 1 wherein the combustion is effected in a multiple-hearth furnace.

* * * * *